(12) United States Patent
Rosthal et al.

(10) Patent No.: US 6,680,613 B2
(45) Date of Patent: Jan. 20, 2004

(54) METHOD AND APPARATUS FOR CANCELLATION OF BOREHOLE EFFECTS DUE TO A TILTED OR TRANSVERSE MAGNETIC DIPOLE

(75) Inventors: Richard A. Rosthal, Houston, TX (US); Dean Homan, Sugar Land, TX (US); Thomas D. Barber, Houston, TX (US); Stephen Bonner, Sugar Land, TX (US); Brian Clark, Sugar Land, TX (US); Dzevat Omeragic, Sugar Land, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 10/367,413

(22) Filed: Feb. 14, 2003

(65) Prior Publication Data

US 2003/0146753 A1 Aug. 7, 2003

Related U.S. Application Data

(62) Division of application No. 09/737,891, filed on Dec. 15, 2000.

(51) Int. Cl.$^7$ .................................................. G01V 3/10
(52) U.S. Cl. ........................................................ 324/339
(58) Field of Search ................................ 324/346, 347, 324/333, 337, 343, 338, 339

(56) References Cited

U.S. PATENT DOCUMENTS 3,305,771 A    2/1967  Arps (List continued on next page.)

FOREIGN PATENT DOCUMENTS

GB         2356935 A      6/2001F (List continued on next page.)

OTHER PUBLICATIONS

Mechetin, et al., Temp—A New Dual Electromagnetic and Laterolog Appara—Technological Complex, The All-Union Research Logging Institute, Ufa, USSR. Ch. Ostraander, Petro Physics International, Dallas, Texas USA, pp 1–16.

(List continued on next page.)

Primary Examiner—Jay Patidar
Assistant Examiner—Reena Aurora
(74) Attorney, Agent, or Firm—Victor H. Segura; Brigitte L. Jeffery; John J. Ryberg

(57) ABSTRACT

Methods and apparatus are disclosed for minimizing or eliminating an undesired axial electric current induced along a subsurface borehole in the process of subsurface measurements with transmitter and/or receiver antennas which are substantially time varying magnetic dipoles with their dipole moments aligned at an angle to the axis of the borehole. Some antennas are disposed within the borehole on instruments having a non-conductive support member. One instrument includes a conductive all-metal body with an antenna adapted for induction frequencies. Antenna shields adapted for controlled current flow are also provided with an all-metal instrument. Methods include providing an alternate path for the current along the instrument body. Another method includes emitting a controlled current to counter the undesired current. Another method corrects for the effect of the current using a superposition technique. An embodiment of the instrument includes an antenna disposed between a pair of electrically coupled electrodes. The antenna is disposed on the instrument such that it comprises a tilted or transverse magnetic dipole. Another embodiment of the instrument includes a non-conductive housing with a conductive segment disposed thereon. An antenna is disposed on the instrument about the conductive segment. Another embodiment includes an antenna disposed between two pairs of electrodes with means to measure a voltage at the electrodes when electromagnetic energy is transmitted within the borehole. Yet another instrument includes an antenna disposed between a first pair of electrodes and means to measure a voltage at the electrodes when electromagnetic energy is transmitted within the borehole. This embodiment also includes means to energize a second electrode pair in response to the voltage measured at the first electrode pair.

8 Claims, 5 Drawing Sheets

U.S. PATENT DOCUMENTS

| | | |
|---|---|---|
| 3,329,889 A | 7/1967 | Tanguy |
| 3,388,325 A | 6/1968 | Birdwell et al. |
| 3,452,269 A | 6/1969 | Welz |
| 3,760,260 A | 9/1973 | Schuster |
| 3,772,589 A | 11/1973 | Scholberg |
| 4,087,740 A | 5/1978 | Suau |
| 4,286,217 A | 8/1981 | Planche et al. |
| 4,319,191 A | 3/1982 | Meador et al. |
| 4,320,224 A | 3/1982 | Rose et al. |
| 4,511,843 A | 4/1985 | Thoraval |
| 4,536,714 A | 8/1985 | Clark |
| 4,538,109 A | 8/1985 | Clark |
| 4,873,488 A | 10/1989 | Barber et al. |
| 4,949,045 A | 8/1990 | Clark et al. |
| 5,041,975 A | 8/1991 | Minerbo et al. |
| 5,058,077 A | 10/1991 | Twist |
| 5,235,285 A | 8/1993 | Clark et al. |
| 5,339,037 A | 8/1994 | Bonner et al. |
| 5,426,368 A | 6/1995 | Benimeli et al. |
| 5,508,616 A * | 4/1996 | Sato et al. ............ 324/343 |
| 5,757,191 A | 5/1998 | Gianzero |
| 5,781,436 A | 7/1998 | Forgang et al. |
| 5,841,280 A * | 11/1998 | Yu et al. ............ 324/323 |
| 6,044,325 A | 3/2000 | Chakravarthy et al. |
| 6,084,052 A | 7/2000 | Aufdermarsh et al. |
| 6,147,496 A | 11/2000 | Strack et al. |
| 6,163,155 A | 12/2000 | Bittar |

FOREIGN PATENT DOCUMENTS

| | | |
|---|---|---|
| GB | 2371870 A | 8/2002 |
| WO | WO 00/45195 | 8/2000 |
| WO | WO 00/50926 | 8/2000 |

OTHER PUBLICATIONS

WO/ 01/51880 A2 Jul. 19, 2001 Martin T Evans, et al.

Search Report dated Sep. 28, 2002 for Great Britain Application No. GB 0129575.7.

* cited by examiner

METHOD AND APPARATUS FOR CANCELLATION OF BOREHOLE EFFECTS DUE TO A TILTED OR TRANSVERSE MAGNETIC DIPOLE

CROSS-REFERENCES

The present application is a divisional of U.S. patent application Ser. No. 09/737,891, filed Dec. 15, 2000.

BACKGROUND OF THE INVENTION

1. Field of the Invention

The invention relates to techniques for reducing and/or correcting for borehole effects encountered in subsurface measurements. More particularly, the invention concerns methods, and devices for their implementation, in which well logging instruments using sources or sensors having a transverse or tilted magnetic dipole are adapted to reduce or correct for undesired electromagnetic effects associated with the deployment of the instruments in a borehole.

2. Description of Related Art

Various well logging techniques are known in the field of hydrocarbon exploration and production. These techniques typically employ logging instruments or "sondes" equipped with sources adapted to emit energy through a borehole traversing the subsurface formation. The emitted energy interacts with the surrounding formation to produce signals that are detected and measured by one or more sensors on the instrument. By processing the detected signal data, a profile of the formation properties is obtained.

Electromagnetic (EM) logging techniques known in the art include "wireline" logging and logging-while-drilling (LWD). Wireline logging entails lowering the instrument into the borehole at the end of an electrical cable to obtain the subsurface measurements as the instrument is moved along the borehole. LWD entails attaching the instrument disposed in a drill collar to a drilling assembly while a borehole is being drilled through earth formations.

Conventional wireline and LWD instruments are implemented with antennas that are operable as sources and/or sensors. In wireline applications, the antennas are typically enclosed by a housing constructed of a tough plastic material composed of a laminated fiberglass material impregnated with epoxy resin. In LWD applications, the antennas are generally mounted on a metallic support to withstand the hostile environment encountered during drilling. Conventional logging instruments are also being constructed of thermoplastic materials. The thermoplastic composite construction of these instruments provides a non-conductive structure for mounting the antennas. U.S. Pat. No. 6,084,052 (assigned to the present assignee) describes implementations of composite-based logging instruments for use in wireline and LWD applications.

In both wireline and LWD applications, the antennas are mounted on the support member and axially spaced from each other in the direction of the borehole. These antennas are generally coils of the cylindrical solenoid type and are comprised of one or more turns of insulated conductor wire that is wound around the support. U.S. Pat. Nos. 4,873,488 and 5,235,285 (both assigned to the present assignee), for example, describe instruments equipped with antennas disposed along a central metallic support. In operation, the transmitter antenna is energized by an alternating current to emit EM energy through the borehole fluid (also referred to herein as mud) and into the formation. The signals detected at the receiver antenna are usually expressed as a complex number (phasor voltage) and reflect interaction with the mud and the formation.

One EM logging technique investigates subsurface formations by obtaining electrical resistivity or conductivity logs by "focused" measurements. U.S. Pat. No. 3,452,269 (assigned to the present assignee) describes an instrument adapted for taking these focused measurements. The technique described in the '269 patent uses a survey current emitted by a principal survey current emitting electrode. This survey current is confined to a path substantially perpendicular to the borehole axis by focusing currents emitted from nearby focusing electrodes. U.S. Pat. No. 3,305,771 describes a focusing technique using an instrument equipped with toroidal coils. U.S. Pat. Nos. 3,772,589, 4,087,740, 4,286,217 (all assigned to the present assignee) describe other electrode-type instruments used for subsurface measurements.

U.S. Pat. No. 5,426,368 (assigned to the present assignee) describes a logging technique using an array of current electrodes disposed on a support. The '368 patent uses the electrode configuration to investigate the geometrical characteristics of the borehole and the resistivity properties of the formation. U.S. Pat. Nos. 5,235,285 and 5,339,037 (both assigned to the present assignee) describe metallic instruments adapted with a toroidal coil and electrode system for obtaining resistivity measurements while drilling. The measurement techniques described in the '285 and '037 patents entail inducing a current that travels in a path including the conductive support body and the formation.

U.S. Pat. Nos. 3,388,325 and 3,329,889 (both assigned to the present assignee) describe instruments equipped with an electrode and coil configuration for obtaining subsurface measurements. U.S. Pat. No. 3,760,260 (assigned to the present assignee) also describes a downhole instrument equipped with electrodes and coils. The '260 patent uses the electrode configuration to ensure radial current flow into the formation surrounding the borehole. U.S. Pat. No. 4,511,843 (assigned to the present assignee) describes a logging technique whereby currents are emitted from electrodes to zero a potential difference between other electrodes on the instrument. U.S. Pat. No. 4,538,109 (assigned to the present assignee) describes a logging technique aimed at correcting or canceling the effects of spurious EM components on downhole measurement signals.

A coil carrying a current can be represented as a magnetic dipole having a magnetic moment proportional to the current and the area. The direction and strength of the magnetic moment can be represented by a vector perpendicular to the plane of the coil. In conventional induction and propagation logging instruments, the transmitter and receiver antennas are mounted with their axes along the longitudinal axis of the instrument. Thus, these instruments are implemented with antennas having longitudinal magnetic dipoles (LMD). When such an antenna is placed in a borehole and energized to transmit EM energy, currents flow around the antenna in the borehole and in the surrounding formation. There is no net current flow up or down the borehole.

An emerging technique in the field of well logging is the use of instruments incorporating antennas having tilted or transverse coils, i.e., where the coil's axis is not parallel to the support axis. These instruments are thus implemented with antennas having a transverse or tilted magnetic dipole (TMD). The aim of these TMD configurations is to provide EM measurements with directed sensitivity and sensitivity to the anisotropic resistivity properties of the formation. Logging instruments equipped with TMDs are described in U.S. Pat. Nos. 4,319,191, 5,508,616, 5,757,191, 5,781,436, 6,044,325, 6,147,496, WO 00/50926, and in V. F. Mechetin et al., *TEMP—A New Dual Electromagnetic and Laterolog Apparatus-technological Complex, Thirteenth European Formation Evaluation Symposium Transactions*, Budapest Chapter, paper K, 1990.

A particularly troublesome property of the TMD is the extremely large borehole effect that occurs in high contrast situations, i.e., when the mud in the borehole is much more conductive than the formation. When a TMD is placed in the center of a borehole, there is no net current along the borehole axis. When it is eccentered in a direction parallel to the direction of the magnetic moment, the symmetry of the situation insures that there is still no net current along the borehole axis. However, when a TMD is eccentered in a direction perpendicular to the direction of the magnetic moment, axial currents are induced in the borehole. In high contrast situations these currents can flow for a very long distance along the borehole. When these currents pass by TMD receivers, they can cause undesired signals that are many times larger than would appear in a homogeneous formation without a borehole.

U.S. Pat. No. 5,041,975 (assigned to the present assignee) describes a technique for processing signal data from downhole measurements in an effort to correct for borehole effects. U.S. Pat. No. 5,058,077 describes a technique for processing downhole sensor data in an effort to compensate for the effect of eccentric rotation on the sensor while drilling. However, neither of these patents relates to the properties or effects of TMDs in subsurface measurements.

Thus there remains a need for improved methods and apparatus for reducing or correcting for these currents when using well logging instruments implemented with TMDs.

SUMMARY OF THE INVENTION

An embodiment of the invention provides an apparatus for use in a borehole traversing a formation. The apparatus comprises an elongated support having a longitudinal axis; at least one antenna disposed on the support such that the magnetic dipole moment of the antenna is tilted or perpendicular with respect to the longitudinal axis of the support. Each antenna is adapted to transmit and/or receive electromagnetic energy. First and second electrodes are disposed on the support, with the second electrode being disposed such that at least one antenna is located between the first and second electrode. The first electrode is coupled to the second electrode to provide a path for a current between the electrodes.

Another embodiment of the invention provides an apparatus for use in a borehole traversing a formation. The apparatus comprises an elongated non-conductive support having a longitudinal axis and at least one conductive segment disposed thereon. At least one antenna is disposed on the support such that the magnetic dipole moment of the antenna is tilted or perpendicular with respect to the longitudinal axis of the support. The at least one antenna is disposed along a conductive segment on the support; and each antenna is adapted to transmit and/or receive electromagnetic energy.

Another embodiment of the invention provides an apparatus for use in a borehole traversing a formation. The apparatus comprises an elongated support having a longitudinal axis and at least one antenna disposed on the support such that the magnetic dipole moment of the antenna is tilted or perpendicular with respect to the longitudinal axis of the support. Each at least one antenna is adapted to transmit and/or receive electromagnetic energy. A first pair of electrodes is disposed on the support and adapted for joint electromagnetic interaction. The first pair of electrodes is disposed such that the at least one antenna is located between the electrodes. A second pair of electrodes is disposed on the support and adapted for joint electromagnetic interaction. The second pair of electrodes is disposed such that the first electrode pair is located between the second electrode pair.

Another embodiment of the invention provides a method for altering the flow of an axial electric current along a subsurface borehole in the vicinity of an antenna disposed within the borehole, the antenna being disposed such that the magnetic dipole moment of the antenna is tilted or perpendicular with respect to the borehole axis and being adapted to transmit and/or receive electromagnetic energy. The method comprises providing first conductive means within the borehole; providing second conductive means within the borehole, the second conductive means positioned such that the antenna is located between the first and second conductive means; and coupling the first and second conductive means to provide a path through the antenna for the axial current to flow between the conductive means.

Another embodiment of the invention provides a method for altering the flow of an axial electric current along a subsurface borehole in the vicinity of an antenna disposed within the borehole, the antenna being disposed on a non-conductive support having a longitudinal axis and adapted for disposal within the borehole, the antenna being adapted to transmit and/or receive electromagnetic energy. The method comprises mounting a conductive segment on the support such that the segment is exposed to the borehole when the support is disposed within the borehole; disposing the antenna along the conductive segment to provide a path through the antenna for the axial current flow when the support is disposed within the borehole; and disposing the antenna along the conductive segment such that the magnetic dipole moment of the antenna is tilted or perpendicular with respect to the longitudinal axis of the support.

Another embodiment of the invention provides a method for altering the flow of an axial electric current along a subsurface borehole in the vicinity of an antenna disposed within the borehole, the antenna being disposed such that the magnetic dipole moment of the antenna is tilted or perpendicular with respect to the borehole axis and being adapted to transmit and/or receive electromagnetic energy. The method comprises disposing a first pair of electrodes within the borehole such that the antenna is located between the electrodes, the first electrode pair being adapted for joint electromagnetic interaction; disposing a second pair of electrodes within the borehole such that the first electrode pair is located between the second electrode pair, the second electrode pair being adapted for joint electromagnetic interaction; measuring an electromagnetic property associated with the axial electric current at the first or second electrode pair; and emitting a current within the borehole in response to the measured electromagnetic property, the current being emitted between: i) the first electrode pair if the second electrode pair was used in the measurement of the electromagnetic property; or ii) the second electrode pair if the first electrode pair was used in the measurement of the electromagnetic property.

Another embodiment of the invention provides a method for correcting for the effect of an axial electric current flow along a subsurface borehole in the vicinity of a receiver antenna disposed within the borehole, the receiver antenna being disposed such that the magnetic dipole moment of the antenna is tilted or perpendicular with respect to the borehole axis, the axial current being associated with electromagnetic energy transmitted from a transmitter antenna disposed within the borehole. The method comprises disposing a first pair of electrodes within the borehole such that the antenna is located between the electrodes, the first electrode pair being adapted for joint electromagnetic interaction; disposing a second pair of electrodes within the borehole such that the first electrode pair is located between the second electrode pair, the second electrode pair being adapted for joint electromagnetic interaction; measuring a voltage signal associated with the transmitted electromagnetic energy at the receiver antenna; measuring a voltage difference between the first or second electrode pair, the voltage difference being associated with the transmitted electromagnetic energy; shutting off transmission of the electromagnetic energy from the transmitter antenna; emitting a current within the borehole, the current being emitted between: i) the first electrode pair if the second electrode pair was used in the voltage difference measurement; or ii) the second electrode pair if the first electrode pair was used in the voltage difference measurement; measuring a voltage signal associated with the emitted current at the receiver antenna; measuring a voltage difference between the electrode pair used in the previous voltage difference measurement, the voltage difference being associated with the emitted current; and calculating a voltage value based on the measured voltage signals and voltage differences.

Another embodiment of the invention provides an apparatus for induction logging within a borehole traversing a formation. The apparatus comprises an elongated conductive metal body having a longitudinal axis and at least one antenna disposed on the body such that the magnetic dipole moment of the antenna is tilted or perpendicular with respect to the longitudinal axis of the body. Each antenna is adapted to transmit and/or receive electromagnetic energy for electromagnetic exploration of the formation.

Another embodiment of the invention provides a method for altering the flow of an axial electric current along a subsurface borehole in the vicinity of an antenna disposed within the borehole, the antenna being disposed on a conductive metal body having a longitudinal axis, the antenna being adapted to transmit and/or receive electromagnetic energy at a frequency range of 1 kHz to 5 MHz. The method comprises disposing the antenna along the metal body such that the magnetic dipole moment of the antenna is tilted or perpendicular with respect to the longitudinal axis of the body; and disposing the metal body within the borehole such that the body is exposed to the borehole to provide a path for the axial current flow.

BRIEF DESCRIPTION OF THE DRAWINGS

Other aspects and advantages of the invention will become apparent upon reading the following detailed description and upon reference to the drawings in which.

DETAILED DESCRIPTION OF SPECIFIC EMBODIMENTS

Before proceeding with disclosure of the invention, some theoretical consideration shall be set forth.

Figure 1:
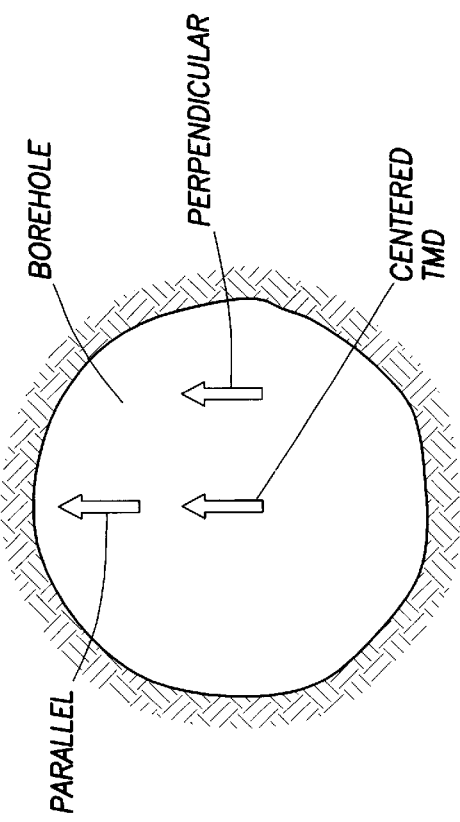
FIG. 1 shows a pictorial looking downhole of parallel and perpendicular eccentering of a tilted or transverse magnetic dipole within a borehole.

A TMD can be eccentered in a borehole in two possible orientations, which we will call parallel and perpendicular eccentering as shown in FIG. 1. Parallel eccentering forces currents symmetrically up and down the borehole and therefore no net current is generated. This borehole effect is no worse than in a typical downhole instrument equipped with non-tilted (axial) antennas. Perpendicular eccentering gives rise to a large axial borehole current in the case of an insulated instrument body, which strongly couples to a transverse receiver an axial distance away (not shown). These two displacements are the extremes of the possible ones. In the general case, the eccentering will be in a direction that is at some angle to the dipole moment of the sensors. In this case, the borehole effect lies between the two extreme cases.

It is important to understand the basic difference between the borehole effect of a conventional LMD and the borehole effect of a TMD. If either type of source is placed in a homogeneous medium, currents will flow in paths surrounding the transmitter. When a borehole is added, these current paths are distorted. These currents induce a voltage in a receiver coil displaced from the transmitter. This voltage is an indication of the resistivity of the formation. If instead of a homogeneous medium, we include a borehole, then the current paths are altered and hence the received voltage is different from what would be measured in the absence of a borehole. This difference is called the "borehole effect." The difference in borehole effect between an LMD and a TMD is due to the difference between the distortion of the currents in the presence of a borehole. With an LMD centered or eccentered in a borehole, these currents flow in the borehole in a region near the transmitter. We know that the field of a localized current distribution can be represented as by a multipole expansion. The leading term (the dipole term) falls off as $1/r^3$, where r is the radial distance in any direction away from the transmitter. Other terms fall off even faster.

For a TMD eccentered in a borehole in a direction along the direction of the dipole moment (parallel), we have a similar situation. Currents flow up one side of the borehole and down the other in a symmetric manner. There is no net current in the borehole past the transmitter. This localized current causes a dipole field just as with an LMD. When the TMD is eccentered in a direction perpendicular to the direction of the dipole moment, these currents are no longer symmetric and a net current flows in the borehole past the transmitter. This current flows up the borehole and returns through the formation. When this current passes the receiver coil, a voltage is induced in the coil. This current falls off, not geometrically at least as rapidly as $1/r^3$, but exponentially as $e^{-(z/z_0)}$ where $z_0$ is proportional to $$\sqrt{\frac{R_{formation}}{R_{mud}}}.$$

When the borehole is much more conductive than the formation, this leads to a very slow falloff in this current.

In the case of an LMD, or a parallel eccentered TMD, the voltage in the receiver is due to the fields from the localized distortion of the current distribution near the transmitter. In the case of a perpendicularly eccentered TMD, it is due to the field from a current travelling in the borehole right past the receiver. This second effect is much larger than the first.

Figure 2:
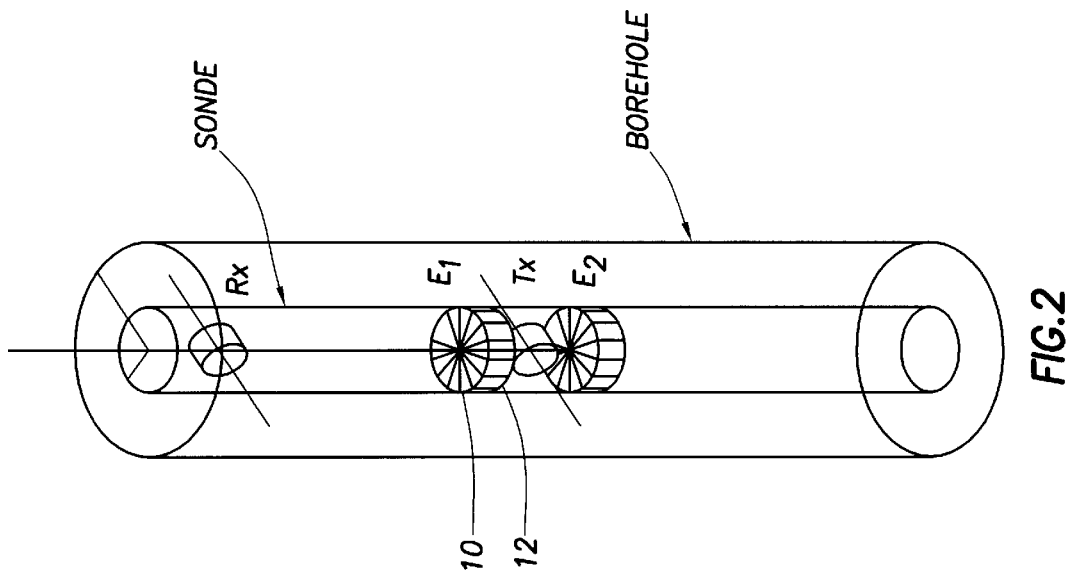
FIG. 2 is a schematic diagram of an instrument with an arrayed electrode configuration according to the invention.
Figure 3:
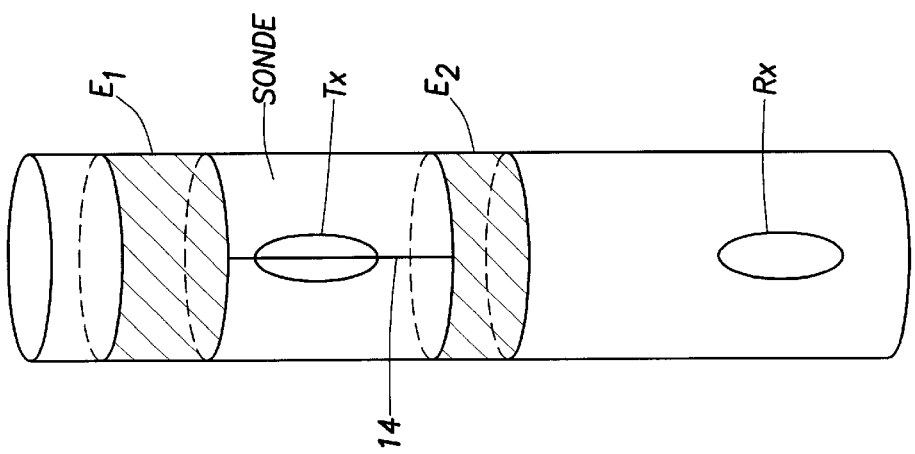
FIG. 3 is a schematic diagram of an instrument with an annular electrode configuration according to the invention.

FIG. 2 shows an embodiment of the invention. A logging instrument with a non-conductive body is shown disposed within a borehole. The instrument is equipped with a transverse (90° axis tilt) transmitter antenna Tx and a transverse receiver antenna Rx. The instrument is also equipped with a pair of electrodes $E_1$, $E_2$ positioned at opposite ends of the transmitter antenna Tx. The electrodes $E_1$, $E_2$ may be formed as an array of circumferentially spaced apart azimuthal metallic electrodes. FIG. 2 shows an electrode configuration composed of an array of sixteen discrete azimuthal metallic segments 10 mounted on an insulating toroid 12. Alternatively, the electrodes $E_1$, $E_2$ may also be formed as one-piece metallic annular electrodes as shown in FIG. 3. If an annular electrode configuration is used, it is preferable to leave an axial gap or opening along the circumference of the electrode. It will be appreciated by those skilled in the art that various types of electrode configurations may be used to implement the invention as known in the art, such as button electrodes.

The electrodes $E_1$, $E_2$ are shorted together with a conductor (e.g., a wire, cable, or metallic strap) 14 that preferably runs through the center of the transmitter antenna Tx. If the electrodes $E_1$, $E_2$ are configured as an array of circumferentially spaced apart azimuthal electrodes, all the electrode segments of $E_1$ are shorted together and all the electrode segments of $E_2$ are shorted together and $E_1$ is shorted to $E_2$. The shorting of the electrodes $E_1$ and the shorting of the electrodes $E_2$ is preferably done with wires that run radially to avoid the formation of an azimuthal current loop. By shorting the electrodes $E_1$, $E_2$ above and below the transmitter Tx, this configuration insures that there is no net electric field along the borehole and so no net current flow. The conductor(s) connecting upper and lower electrodes $E_1$, $E_2$ pass through the transmitter Tx and allow currents flowing through the borehole to close. This leads to a localized current distribution without the long-range axial currents, which would otherwise be present in the borehole. This localized distribution of currents has, at most, a dipole moment which falls off at least as fast as $1/L^3$, where L is the spacing between antennas. In effect, this configuration shorts the azimuthally varying induced axial current through the transmitter Tx and forms a local magnetic dipole in opposition to the TMD. The electrodes $E_1$, $E_2$ may be mounted on the instrument by any suitable means known in the art.

Figure 4:
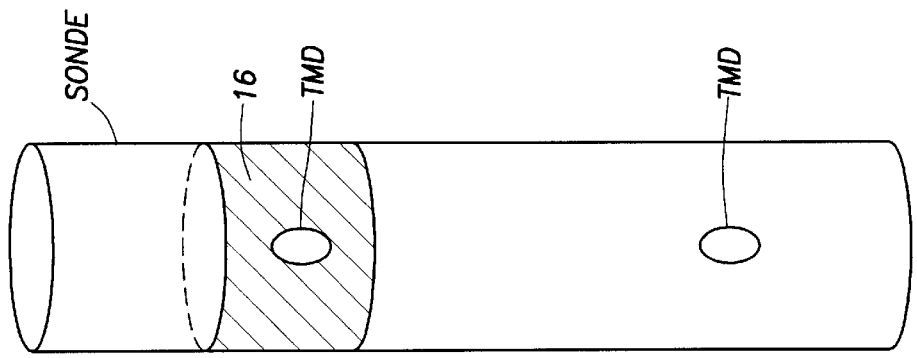
FIG. 4 is a schematic diagram of an instrument with a conductive segment disposed on a non-conductive support according to the invention.

FIG. 4 shows another embodiment of the invention. By mounting the TMD about a conductive segment 16 disposed along the non-conductive support member of the instrument, a local induced current distribution is formed. The current loop that is created is composed of the borehole and conductive segment 16. The conductive segment 16 may be formed as a metallic tube or sleeve mounted on the non-conductive support. The instrument may be equipped with multiple conductive segments and antennas as desired. Modeling and experiments show that the current that flows in the borehole and metal section of the instrument is limited in axial extent to a few times the borehole diameter. Thus the length of the conductive section is variable, but preferably more than a few times the diameter of the largest borehole where the instrument may be run.

With the conductive segment 16 disposed in alignment with an antenna and in contact with the borehole fluid, the axial current induced in the borehole returns through the instrument body in the vicinity of the antenna instead of traveling for a long distance along the borehole. If the conductive segment 16 is about the receiver antenna, then the axial current that would otherwise travel in the borehole will instead travel in the conductive segment 16. Thus, the flow of the induced axial current along the borehole is minimized by providing an alternate path for the current along the instrument body. An alternative embodiment extends the conductive segment 16 to the length of the instrument (not shown), in essence consisting of a full-metal sleeve along the support.

Figure 5:
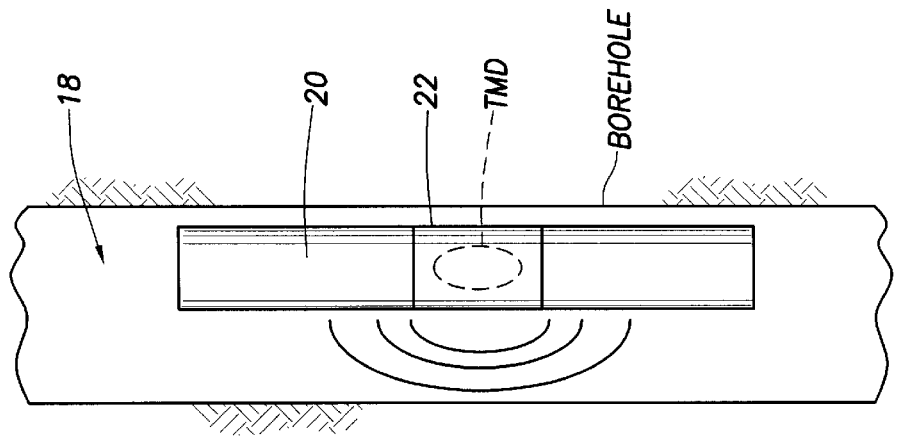
FIG. 5 is a schematic diagram illustrating the current paths encountered with a conductive all-metal instrument having a perpendicularly eccentered tilted or transverse magnetic dipole in accord with the invention.

Conventional induction logging instruments, particularly wireline instruments, comprise antennas in housings formed of non-conductive materials such as fiberglass reinforced epoxy resin. FIG. 5 shows another embodiment of the invention. A TMD antenna is disposed on a logging instrument 18 consisting of an all-metal body 20. A layer of an electrically insulating material (e.g., Randallite, fiberglass-epoxy, or rubber) is placed between the antenna and the body 20. The instrument 18 is also equipped with a signal generator mounted within the body (not shown) to pass an alternating current through the antenna. The signal generator operating frequency is generally between 1 kHz and 5 MHz. Alternatively, the current may be fed to the antenna through a wireline cable as known in the art.

As shown in FIG. 5, when the instrument 18 is eccentered in the borehole, the metallic body 20 is exposed to the borehole fluid such that a local induced current distribution is formed along the body 20. A shield 22 is also mounted on the body 20 to protect the TMD antenna and to permit the passage of particular desired electromagnetic energy components. U.S. Pat. Nos. 4,949,045 and 4,536,714 (both assigned to the present assignee) describe conductive metallic shield configurations that may be used. Those skilled in the art will appreciate that other suitable shields may be used with the instrument 18. For example, a shield may be configured in the form of a strip (not shown), also referred to as flex circuit, to provide flexibility and easy mounting.

For effective operation of the TMD antenna, the resulting current flow should not induce a voltage in the antenna. Thus if a conductive shield 22 is placed over the antenna so that current flows there instead of in the borehole fluid, a zero current will be induced in the antenna if the current in the shield 22 is azimuthally symmetric. Otherwise the voltage in the receiver antenna may be greater than it would be if current were flowing in the mud. The desired axisymmetric current distribution may be achieved by disposing a conductive material between the shield 22 and the body 20 such that an azimuthally uniform connection is formed. For example, a conductive metallic O-ring or gasket may be disposed at both ends of the shield 22 such that there are no breaks between the shield 22 and the body 20 (not shown).

With respect to the embodiment of FIG. 4, the conductive segment 16 on the non-conductive support redirects the induced current through the conductor centered through the TMD such that there will be zero voltage induced in the TMD within the mechanical accuracy of the placement of the conductor.

A zero current induced in the TMD antenna is also achieved by insulating the conductive shield 22 from the metallic body 20. This may be attained by mounting the shield 22 on the body 20 such that one end is fully insulated (not shown). Randallite, fiberglass-epoxy, rubber, or any suitable nonconductive material or compound may be disposed between the shield 22 and the body 20 to provide the desired insulation. Alternatively, the TMD may be sealed or potted onto the body 20 with a rubber over-molding or any suitable non-conductive compound that permits the passage of EM energy. Yet another embodiment comprises a shield 22 made of an insulating material to permit the passage of EM radiation. Useable materials include the class of polyetherketones described in U.S. Pat. Nos. 4,320,224 and 6,084,052 (assigned to the present assignee), or other suitable resins. Victrex USA, Inc. of West Chester, Pa. manufactures one type called PEEK. Cytec Fiberite, Greene Tweed, and BASF market other suitable thermoplastic resin materials. Another usable insulating material is Tetragonal Phase Zirconia ceramic ("TZP"), manufactured by Coors Ceramics of Golden, Colo.

Figure 6:
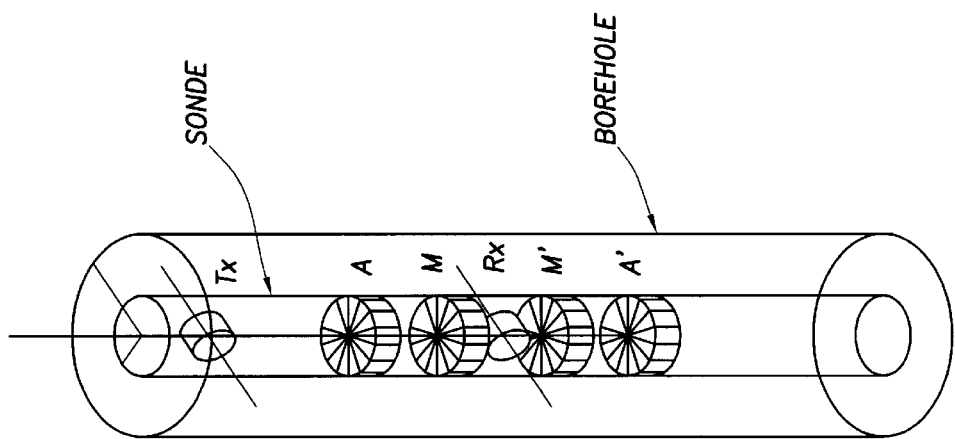
FIG. 6 is a schematic diagram of an instrument with multiple electrode pairs configured about an antenna according to the invention.

FIG. 6 shows another embodiment of the invention. A logging instrument with a non-conductive body is shown disposed within a borehole. The instrument is equipped with a transverse transmitter antenna Tx and a transverse receiver antenna Rx. The receiver antenna Rx is positioned between a pair of measure electrodes M, M', which are themselves positioned between a pair of current electrodes A, A'. The electrodes M, M', A, A' may be formed as an array of circumferentially spaced apart metallic electrodes or as an annular electrode as described above.

Figure 7:
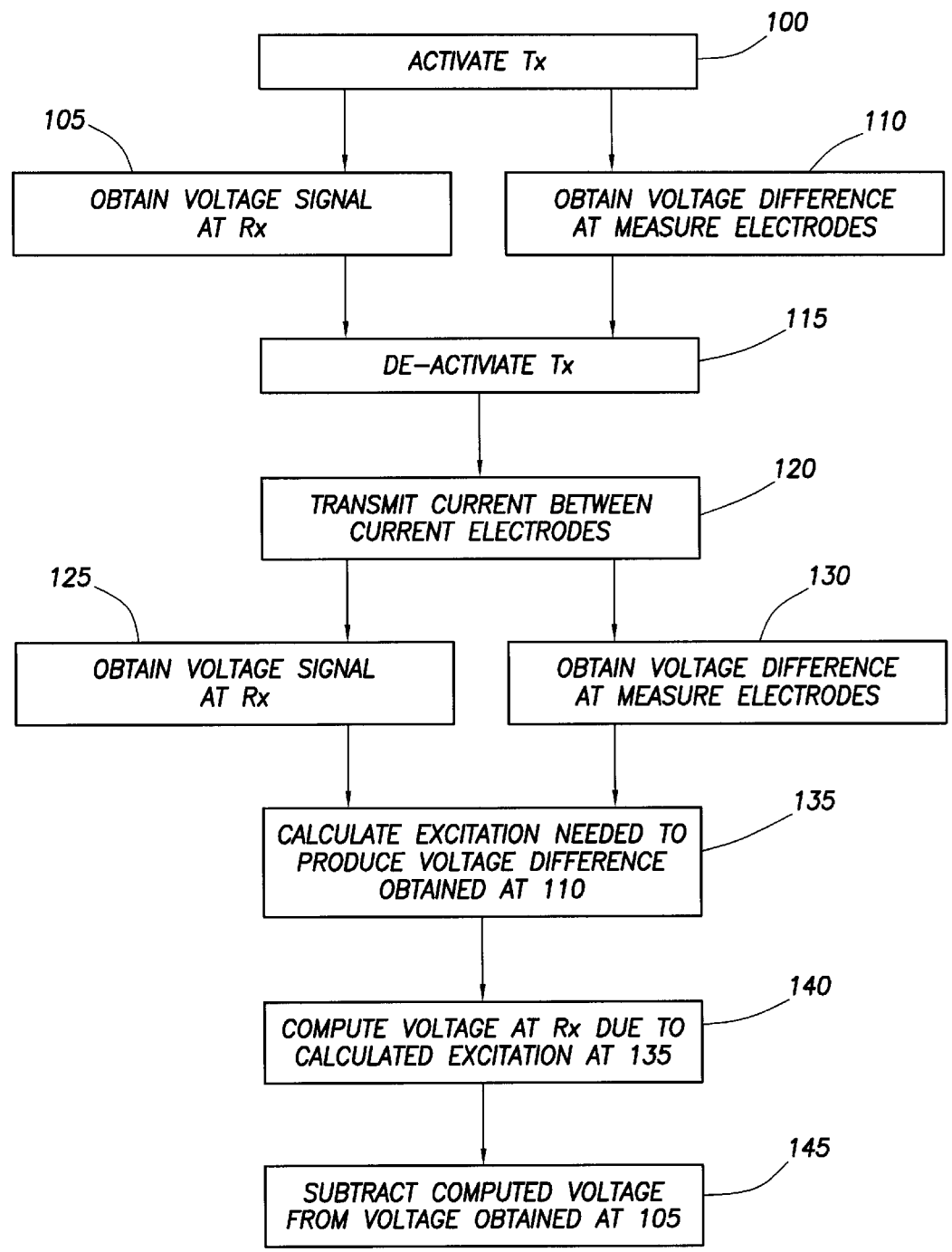
FIG. 7 shows a flow chart of an embodiment of a method according to the invention.

One embodiment of the invention involves a process using the principle of superposition and a digital focusing approach. This embodiment is shown in flow chart form in FIG. 7. This technique may be implemented with the embodiment of FIG. 6. In this process, the transmitter antenna Tx is activated, at 100, and the voltage signal ($V_{R1}$) at the receiver antenna Rx as well as the voltage difference ($\Delta V_{M1}$) on the measure electrodes M, M' are obtained at 105, 110. The transmitter antenna is then shut off, at 115, and a current is run between the current electrodes A, A' at 120. The voltage at the measure electrodes ($\Delta V_{M2}$) and the voltage signal ($V_{R2}$) at the receiver antenna are again measured at 125, 130.

The excitation necessary to produce the set of voltages ($\Delta V_{M1}$) on the measure electrodes M, M' is then calculated, at 135, and the voltage in the receiver antenna Rx due to this excitation is computed at 140. This voltage is then subtracted from the voltage actually measured to produce the borehole-corrected signal at 145. Mathematically the equation is expressed as $$V_{Corr} = V_{R1} - \frac{\Delta V_{M1}}{\Delta V_{M2}} V_{R2}. \tag{1}$$

This voltage should be equal to the voltage that would appear on the receiver antenna Rx if the longitudinal current in the borehole did not exist in a high contrast situation. Since the transmitter antenna Tx operates at some finite frequency, and all the voltages are complex (they include an amplitude and a phase shift relative to the transmitter current or the electrode currents), the currents injected from the electrodes A, A' are at the same frequency.

The instruments of the invention may be equipped with conventional electronics and circuitry to activate the sources and sensors to obtain the desired measurements as known in the art. Once acquired, the data may be stored and/or processed downhole or communicated to the surface in real time via conventional telemetry systems known in the art.

Figure 8:
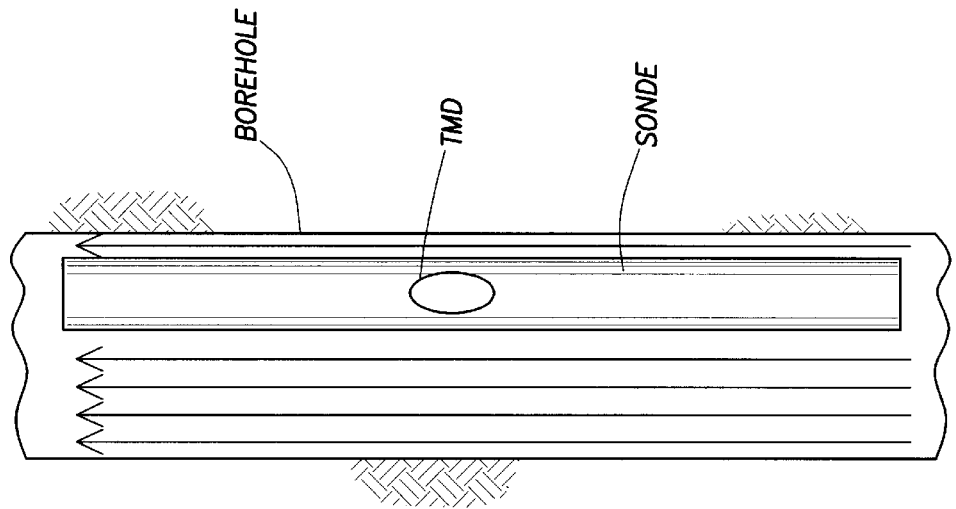
FIG. 8 is a schematic diagram of the induced axial current flow encountered in the borehole with a non-conductive instrument having a perpendicularly eccentered tilted or transverse magnetic dipole.
Figure 9:
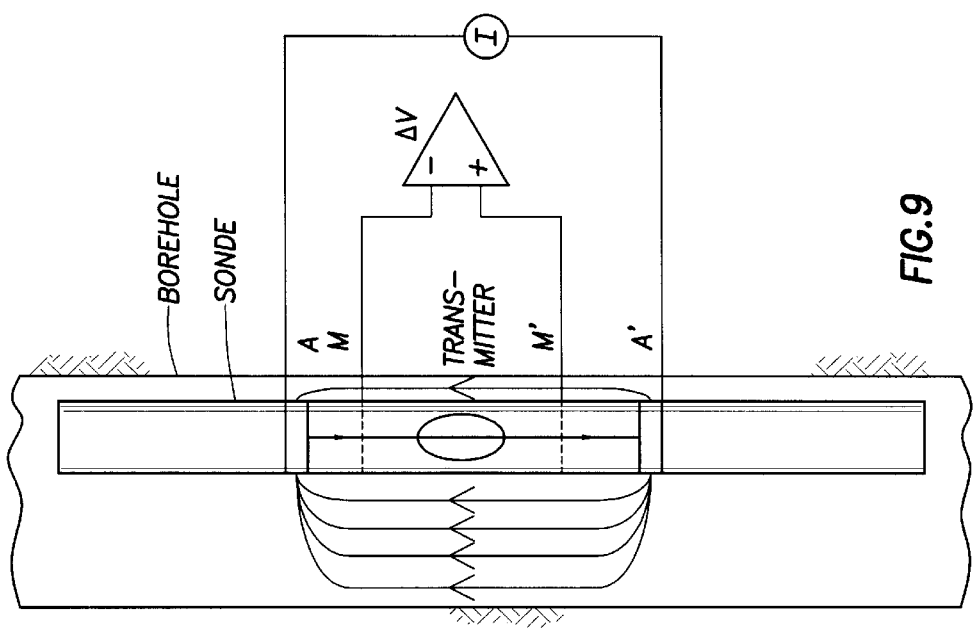
FIG. 9 illustrates the current injected into the borehole from an instrument equipped with electrode pairs about a source according to the invention.

FIG. 8 illustrates the induced axial current flow encountered in the borehole with a typical non-conductive instrument equipped with a TMD when the TMD is perpendicularly eccentered in a conductive borehole. FIG. 9 shows another embodiment of the invention. This particular embodiment entails a feedback process. The embodiment of FIG. 9 is similar to that of FIG. 6. The measure electrodes M, M' are adapted to sample and measure the azimuthally varying magnitude of the induced electric field. Current is then injected into the borehole by the current electrodes A, A' to counter or cancel the borehole current measured by the measure electrodes M, M'. Thus, current is discharged from the current electrodes A, A' in such a way as to achieve the condition that the voltage difference between M and M' is made equal to zero. That is $\Delta V = V_M - V_{M'} = 0$.

Figure 10:
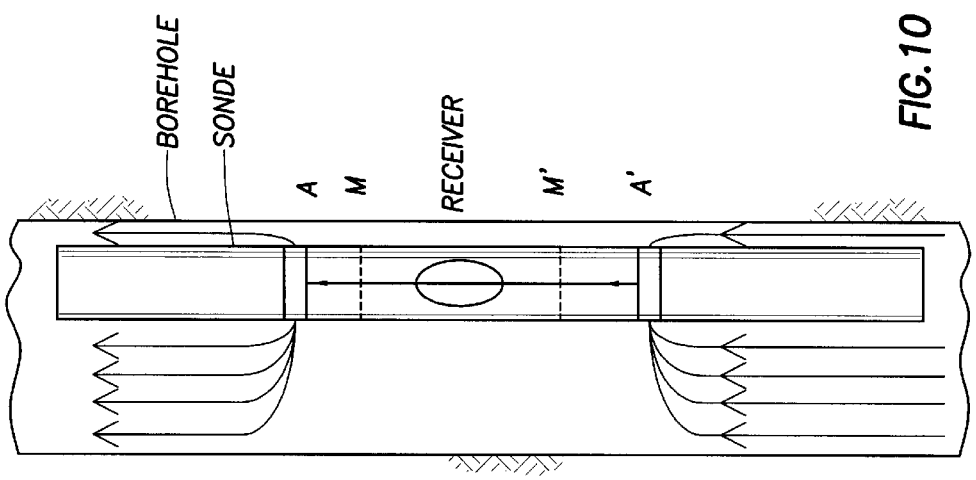
FIG. 10 is a schematic diagram of the axial current flow about an instrument equipped with electrode pairs about a sensor according to the invention.

FIG. 10 shows another embodiment of the invention. The embodiment shown in FIG. 10 is similar to that of FIG. 9, except that the electrodes are disposed about a TMD receiver on a typical non-conductive instrument. With this configuration, the induced current flows up the borehole, enters the current electrode A', travels up the instrument to the second electrode A, and continues up the borehole. In the immediate vicinity of the TMD, there is no current flow in the borehole. The measure electrodes M and M' provide an analog feedback to the current electrodes A, A' to just cancel the borehole effect. Thus, the flow of the axial current along the borehole is countered with the injection of another current emitted within the borehole.

As known in the art, the signals measured with induction frequencies are affected by direct transmitter-to-receiver coupling. Therefore, the logging instruments of the invention may also include so-called "bucking" antennas to eliminate or reduce these coupling effects. It will also be understood by those skilled in the art that the principle of reciprocity provides that the electrode and/or conductive segment configurations of the invention will work whether they are implemented about the transmitters or receivers on the instrument. The spacing between the electrodes and/or antennas in the direction of the borehole may also be varied for effective implementation of the invention. In addition, the logging instruments of the invention may be "propagation" instruments in which quantities such as phase shift or attenuation could be measured between pairs of receivers.

While the methods and apparatus of this invention have been described as specific embodiments, it will be apparent to those skilled in the art that other embodiments of the invention can be readily devised which do not depart from the concept and scope of the invention as disclosed herein. All such similar variations apparent to those skilled in the art are deemed to be within the scope of the invention as defined by the appended claims.

What is claimed is:

1. An apparatus for use in a borehole traversing a formation, comprising:
    an elongated non-conductive support having a longitudinal axis and at least one conductive segment disposed thereon such that said segment is exposed to the borehole when the support is disposed within the borehole;

at least one antenna disposed on the support such that the magnetic dipole moment of the antenna is tilted or perpendicular with respect to the longitudinal axis of the support;

the at least one antenna being disposed along a conductive segment on the support; and each at least one antenna being adapted to transmit and/or receive electromagnetic energy.

2. The apparatus of claim 1, wherein each at least one conductive segment comprises a metallic tubular coaxially disposed on the outer circumference of the support.

3. The apparatus of claim 2, wherein each at least one antenna disposed along a conductive segment is electrically insulated from the conductive segment.

4. The apparatus of claim 2, wherein the support comprises a plurality of independent conductive segments disposed thereon.

5. The apparatus of claim 4, wherein the support comprises two independent conductive segments, each conductive segment having an antenna disposed thereon.

6. The apparatus of claim 5, wherein the antennas disposed on the two conductive segments have their magnetic dipole moments tilted or perpendicular with respect to the longitudinal axis of the support.

7. A method for altering the flow of an electric current along a subsurface borehole in the vicinity of an antenna disposed within the borehole, the antenna being disposed on a non-conductive support having a longitudinal axis and adapted for disposal within the borehole, the antenna being adapted to transmit and/or receive electromagnetic energy, comprising:

a) equipping the support with a conductive segment such that the segment is exposed to the borehole when the support is disposed within the borehole;

b) disposing the antenna along the conductive segment to provide a path through the antenna for current flow when the support is disposed within the borehole; and c) disposing the antenna along the conductive segment such that the magnetic dipole moment of the antenna is tilted or perpendicular with respect to the longitudinal axis of the support.

8. The method of claim 7, wherein the conductive segment comprises a metallic tubular coaxially disposed on the outer circumference of the support.

* * * * *